(12) United States Patent
Miura

(10) Patent No.: US 8,447,029 B2
(45) Date of Patent: May 21, 2013

(54) COMMUNICATION APPARATUS AND CONTROL METHOD THEREFOR

(75) Inventor: Shigeo Miura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 12/838,327

(22) Filed: Jul. 16, 2010

(65) Prior Publication Data

US 2011/0019813 A1   Jan. 27, 2011

(30) Foreign Application Priority Data

Jul. 27, 2009 (JP) ................... 2009-174744
May 27, 2010 (JP) ................... 2010-122030

(51) Int. Cl.
  *H04M 1/00* (2006.01)
(52) U.S. Cl.
  USPC ........... 379/383; 379/378; 379/379; 379/381; 379/382; 379/384
(58) Field of Classification Search ........... 379/378–385
  See application file for complete search history.

(56) References Cited

U.S. PATENT DOCUMENTS 6,968,045 B1* 11/2005 Cannon et al. ............. 379/93.09
2006/0002544 A1* 1/2006 Kim .............................. 379/378
2007/0041543 A1* 2/2007 Kabeya ......................... 379/157

FOREIGN PATENT DOCUMENTS

JP            5-7273 A      1/1993

\* cited by examiner

*Primary Examiner* — Duc Nguyen
*Assistant Examiner* — Ibraham Sharifzada
(74) *Attorney, Agent, or Firm* — Fitzpatrick, Cella, Harper & Scinto

(57) ABSTRACT

This invention provides a communication apparatus, which suppresses abrupt changes of a current and voltage generated in a communication line upon connecting an external telephone to the communication line, and a control method thereof. To accomplish this, in a communication apparatus of this invention, when an off-hook state of an external telephone is detected upon connecting the external telephone to a communication line, an SOC captures a line using a first line capture means having an impedance lower than the external telephone side, and then switches an H-relay to connect the external telephone to the communication line. Furthermore, the SOC temporarily switches a line capture state to a second line capture means having an impedance higher than the first line capture means after the H-relay is switched and before the line is released.

8 Claims, 9 Drawing Sheets

COMMUNICATION APPARATUS AND CONTROL METHOD THEREFOR

BACKGROUND OF THE INVENTION

1. Field of the Invention

The present invention relates to a communication apparatus and control method therefor.

2. Description of the Related Art

Conventionally, communication apparatuses such as facsimile (FAX) apparatuses are available which can connect, to a communication line such as a telephone line, not only a FAX communication unit for a FAX communication (modem) but also a telephone for a voice communication. For example, Japanese Patent Laid-Open No. 05-007273 discloses a FAX apparatus which can selectively connect a data communication unit used to make a data communication and a telephone used to make a voice communication to a communication line. When this FAX apparatus switches the data communication unit to the telephone and connects it to the communication line, the data communication unit and telephone are connected to the communication line in parallel to each other, so as to supply a line current to the telephone, thereby setting the telephone in a voice communication ready state before switching connection to it.

Some of such conventional FAX apparatuses are connected to a public branch exchange (PBX), but most of them are connected to a public switched telephone network (PSTN). Strict managements are made for FAX apparatuses connected to the PSTN and apparatuses introduced as switching equipments on the PSTN side, so that these apparatuses meet predetermined technical criteria.

On the other hand, a technique called "VoIP" (Voice over Internet Protocol) which exchanges voice data using an IP network having a broadband transmission path such as a Digital Subscriber Line (DSL) or optical line has prevailed.

When the user connects the aforementioned communication apparatus for the PSTN (a FAX apparatus will be exemplified below) to the IP network, and makes a voice communication by a telephone connected to the communication apparatus using the VoIP, he or she encounters the following problem. For example, an adapter which serves as an interface used to convert a voice signal output from the apparatus into a signal having a format suited to the IP network is required. This adapter normally not only sends the input voice signal onto the IP network, but also specifies a communication destination by detecting an input dial pulse signal.

Since the adapter connected to the FAX apparatus is not connected to the PSTN, it is not required to meet the predetermined technical criteria required for the PSTN connection. For this reason, such adapter may often erroneously detect, as a dial pulse signal, a weak current or voltage change having a short time width at a level as low as it cannot be detected as a regular dial pulse signal according to the criteria for the PSTN.

More specifically, in the communication apparatus, a weak current or voltage change having a very short time width, which is caused upon switching of an internal relay or an off-hook operation of the externally attached telephone, may often be erroneously detected by the aforementioned adapter as a dial pulse signal. In this case, the apparatus cannot dial to a correct destination based on the dial pulse signal from the telephone.

SUMMARY OF THE INVENTION

The present invention has been made in consideration of the aforementioned problems, and provides a communication apparatus which aims to suppress abrupt changes of a current and voltage generated in a communication line upon connecting an external telephone to the communication line.

One aspect of the present invention provides a communication apparatus, which comprises a connection unit that an external telephone is connected to, a switching unit that switches between a connection state in which the external telephone is connected to a line and a disconnection state in which the external telephone is disconnected from the line, a detection unit that detects an off-hook state of the external telephone, and a network control unit that is connected to the line in parallel to the external telephone, and controls a capture state of the line, the apparatus comprising: a first capture control unit that captures, when the detection unit detects the off-hook state of the external telephone in the disconnection state, the line using a first line capture unit, an impedance of which is lower than the external telephone side, and which is included in the network control unit; a connection control unit that connects the external telephone to the line by switching the switching unit to the connection state after the first line capture unit captures the line; a second capture control unit that captures the line by switching to a second line capture unit, an impedance of which is higher than the first line capture unit and which is included in the network control unit, after the external telephone is connected to the line; and a line release unit that releases the capture state of the line by the second line capture unit after the second line capture unit captures the line.

Another aspect of the present invention provides a communication apparatus, which comprises a connection unit that an external telephone is connected to, a switching unit that switches between a connection state in which the external telephone is connected to a line and a disconnection state in which the external telephone is disconnected from the line, a detection unit that detects an off-hook state of the external telephone, and a network control unit that is connected to the line in parallel to the external telephone, and controls a capture state of the line, the apparatus comprising: a first capture control unit that sets, when the detection unit detects the off-hook state of the external telephone in the disconnection state, an impedance of a line capture unit included in the network control unit to be a first impedance lower than the external telephone side, and captures the line using the line capture unit; a connection control unit that connects the external telephone to the line by switching the switching unit to the connection state after the line capture unit of the first impedance captures the line; a second capture control unit that changes the impedance of the line capture unit to a second impedance higher than the first impedance, and captures the line using the line capture unit, after the external telephone is connected to the line; and a line release unit that releases the capture state of the line by the line capture unit after the line capture unit of the second impedance captures the line.

Still another aspect of the present invention provides a control method of a communication apparatus, which comprises a connection unit that an external telephone is connected to, a switching unit that switches between a connection state in which the external telephone is connected to a line and a disconnection state in which the external telephone is disconnected from the line, a detection unit that detects an off-hook state of the external telephone, and a network control unit that is connected to the line in parallel to the external telephone, and controls a capture state of the line, the method comprising: controlling a first capture control unit to capture, when the detection unit detects the off-hook state of the external telephone in the disconnection state, the line using a first line capture unit, an impedance of which is lower than the external telephone side, and which is included in the network control unit; controlling a connection control unit to connect the external telephone to the line by switching the switching unit to the connection state after the first line capture unit captures the line; controlling a second capture control unit to capture the line by switching to a second line capture unit, an impedance of which is higher than the first line capture unit and which is included in the network control unit, after the external telephone is connected to the line; and controlling a line release unit to release the capture state of the line by the second line capture unit after the second line capture unit captures the line.

Yet another aspect of the present invention provides a control method of a communication apparatus, which comprises a connection unit that an external telephone is connected to, a switching unit that switches between a connection state in which the external telephone is connected to a line and a disconnection state in which the external telephone is disconnected from the line, a detection unit that detects an off-hook state of the external telephone, and a network control unit that is connected to the line in parallel to the external telephone, and controls a capture state of the line, the method comprising: controlling a first capture control unit to set, when the detection unit detects the off-hook state of the external telephone in the disconnection state, an impedance of a line capture unit included in the network control unit to be a first impedance lower than the external telephone side, and to capture the line using the line capture unit; controlling a connection control unit to connect the external telephone to the line by switching the switching unit to the connection state after the line capture unit of the first impedance captures the line; controlling a second capture control unit to change the impedance of the line capture unit to a second impedance higher than the first impedance, and to capture the line using the line capture unit, after the external telephone is connected to the line; and controlling a line release unit to release the capture state of the line by the line capture unit after the line capture unit of the second impedance captures the line.

An advantage of the claimed invention is that it can provide a communication apparatus which suppresses abrupt changes of a current and voltage generated in a communication line upon connecting an external telephone to the communication line.

Further features of the present invention will become apparent from the following description of exemplary embodiments (with reference to the attached drawings).

DESCRIPTION OF THE EMBODIMENTS

Figure 1:
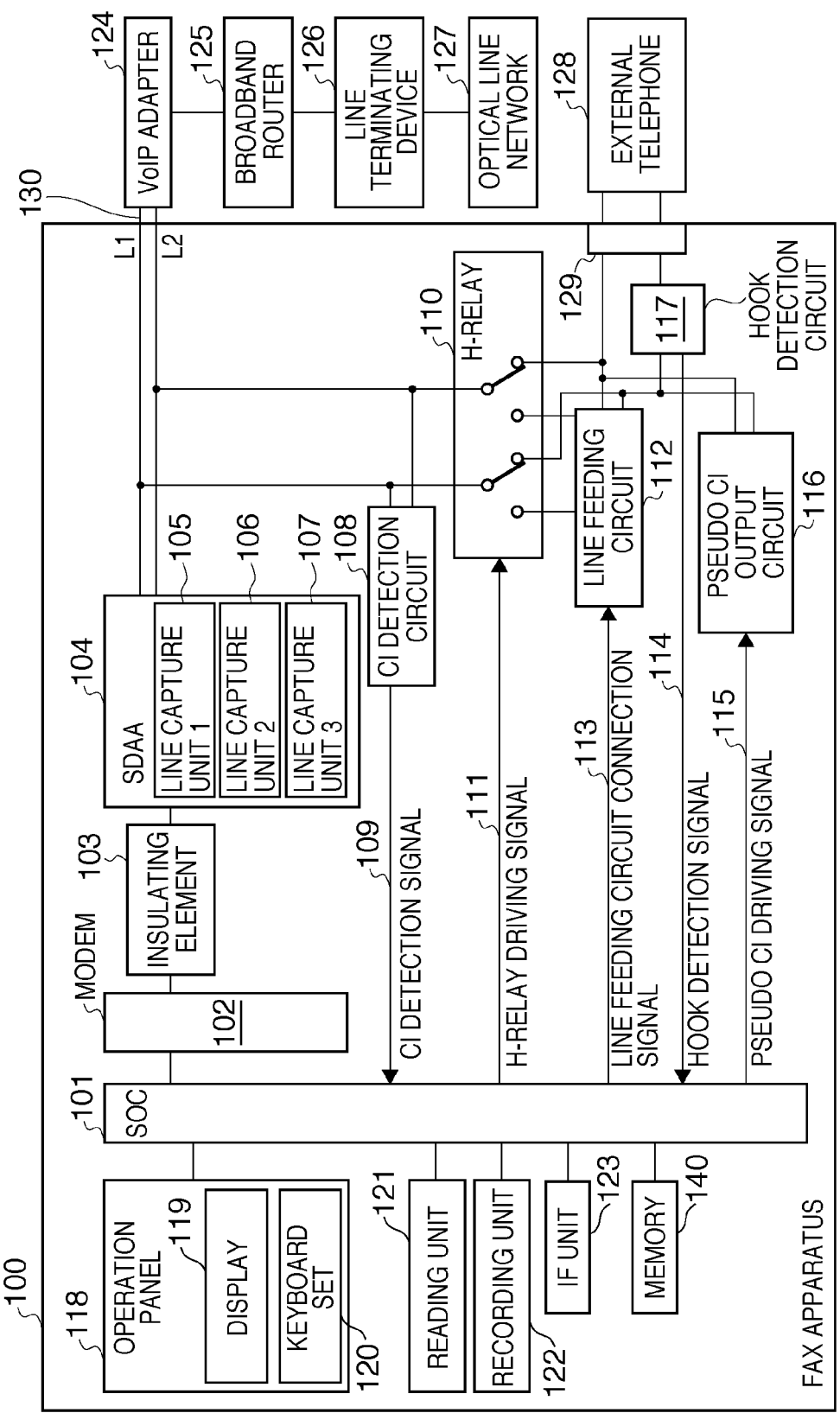
FIG. 1 is a block diagram showing an example of the block arrangement of a FAX apparatus 100 according to an embodiment of the present invention.

An embodiment of the present invention will be described hereinafter. The technical scope of the present invention is not limited by the following embodiment.

Overall Arrangement of FAX Apparatus

The block arrangement of a communication apparatus (a FAX apparatus will be exemplified below) 100 according to an embodiment of the present invention will be described below with reference to FIG. 1. A System-On-Chip (SOC) 101 controls the overall system of the FAX apparatus 100. A CPU (not shown) in the FAX apparatus 100 is mounted on the SOC 101. A memory 140 connected to the SOC 101 is a main storage device, and serves as a system work memory of the CPU of the SOC 101, and a memory for storing control programs required to implement processes shown in FIGS. 3A, 3B and 4. The memory 140 also serves as a memory used to temporarily store image data and various kinds of information in, e.g., a FAX sending or receiving operation.

To the SOC 101, an operation panel 118, reading unit 121, recording unit 122, and interface (IF) unit 123 are connected. The operation panel 118 includes a display 119 and keyboard set 120, which serve as a user interface. The display 119 displays states and menus of the apparatus. The keyboard set 120 includes a keyboard such as buttons and a ten-key pad which accept various instructions input from the user. The reading unit 121 reads an image from a document, and generates image data. The generated image data may be FAX-sent to a partner apparatus via a communication line 130, or may be stored and saved in the recording unit 122. The interface (IF) unit 123 serves as an interface when various information devices are externally connected.

A modem 102 is a modulator/demodulator, which is connected to the SOC 101, and operates under the control of the SOC 101. The modem 102 executes modulation processing using image data to be FAX-sent, which is read by the reading unit 121, and demodulation processing of a signal received via the communication line 130. The modem 102 is connected to an SDAA (Silicon Data Access Arrangement) 104 via an insulating element 103.

The SDAA 104 is an example of a network control unit, and is a semiconductor NCU (Network Control Unit). The SDAA 104 is a network control device, which is connected to the communication line 130, and serves as an interface between the FAX apparatus 100 and external public line (communication line) 130. Upon making a communication with a partner apparatus via the communication line 130, the SDAA 104 controls a line connection (capture) state. To the communication line 130, a telephone 128 which is externally attached to the FAX apparatus 100 via a connection terminal (connection unit) 129 is also connected. The telephone 128 is connected to the communication line 130 via the connection terminal 129 and an H-relay 110, and the SDAA 104 is connected to the communication line 130 in parallel to the telephone 128. The SDAA 104 not only captures a line to control a communication upon making a FAX-sending/receiving operation, but also controls a line capture state when the telephone 128 is used to make a voice communication with a partner apparatus via the communication line 130. The SDAA 104 executes these control operations under the control of the SOC 101.

The SDAA 104 includes three line capture units, i.e., line capture units 1 to 3 (line capture units 105, 106 and 107). As will be described later, the SDAA 104 selects one of these line capture units and controls a line capture state using the selected unit under the control of the SOC 101. Note that the line capture units 1 to 3 are respectively examples of first, second, and third line capture units. These line capture units respectively have DC characteristics of different impedances. The line capture unit 1 has an impedance viewed from the communication line 130 lower than the telephone 128 side, and has, for example, DC characteristics of about 150Ω (low impedance) with respect to a current of 20 mA. On the other hand, the line capture unit 2 has an impedance higher than the line capture unit 1, and has, for example, DC characteristics of about 600Ω (high impedance) with respect to a current of 20 mA. These line capture units 1 and 2 are used upon capturing a line so as to connect the telephone 128 to the communication line 130.

The line capture unit 3 is used when the SDAA 104 makes a communication with a partner apparatus via the communication line 130. For this purpose, the line capture unit 3 has an impedance suitable for use in a communication, i.e., that which is higher than the line capture unit 1 and is lower than the line capture unit 2. For example, the line capture unit 3 has DC characteristics of about 300Ω (middle impedance) with respect to a current of 20 mA.

A CI (Call Indicator) detection circuit 108 is connected to the communication line 130, and detects a calling signal (to be referred to as a "CI signal" hereinafter) received from the communication line. Upon detection of a CI signal from the communication line, the CI detection circuit 108 sends a CI detection signal 109 indicating that detection to the SOC 101. The SOC 101 can check based on the CI detection signal 109 whether or not to receive a CI signal from the communication line.

The H-relay 110 is a circuit used to connect the external telephone 128 connected via a hook detection circuit 117 to either a line feeding circuit 112 or the communication line 130. The H-relay 110 is an example of a switching unit that switches between a connection state in which the external telephone 128 is connected to the communication line 130, and a disconnection state in which the telephone 128 is disconnected from the communication line 130, and is connected to the communication line 130, but via the line feeding circuit. If the external telephone 128 is connected to the communication line 130, this does not necessarily mean that a signal/current is transmitted from the line to eh external telephone if the signal/current is preferring to be transmitted via the SDAA 104, for example because the impedance of the SDAA 104 is lower than that of the external telephone. Also, the H-relay 110 is controlled by the SOC 101 using an H-relay driving signal 111. Note that when the H-relay 110 is connected, as shown in FIG. 1, the FAX apparatus 100 is set in a state in which the external telephone rings in response to an incoming call.

The line feeding circuit 112 is a circuit which supplies a current from the communication line to the hook detection circuit 117. The line feeding circuit 112 supplies a current to the hook detection circuit 117 based on a line current fed from the communication line 130. The line feeding circuit 112 internally switches between connection to and disconnection from the communication line 130 under the control of the SOC 101 using a line feeding circuit connection signal 113.

The hook detection circuit 117 is an example of a detection unit, and is a circuit which is connected to the telephone 128 and detects an off-hook or on-hook state of the telephone 128. The hook detection circuit 117 transmits an off-hook or on-hook detection result of the telephone 128 to the SOC 101 using a hook detection signal 114. The SOC 101 can determine a hook state of the telephone 128 based on the hook detection signal 114. The hook detection circuit 117 detects a current that flows to the telephone 128 in both a case in which the telephone 128 is connected directly to the communication line 130 by the H-relay 110 and a case in which it is connected to the communication line 130 via the line feeding circuit 112. Then, an on-hook or off-hook state of the telephone 128 is detected.

A pseudo CI output circuit 116 is a circuit which outputs a pseudo CI signal to the telephone 128. The pseudo CI signal is a signal to be sent to the telephone 128 in a state disconnected from a line so as to cause the telephone 128 to ring upon reception of a CI signal from a partner apparatus via the communication line 130. The pseudo CI output circuit 116 outputs the pseudo CI signal to the telephone 128 in response to an output instruction based on a pseudo CI driving signal 115 from the SOC 101.

In this embodiment, the FAX apparatus 100 is connected to a VoIP adapter 124 via the communication line 130. The VoIP adapter 124 applies PCM (pulse-code modulation) encoding to a FAX or telephone sending signal having a voice-band frequency ranging from 300 to 3400 Hz, and sends the signal onto the IP network using a protocol such as SIP (Session Initiation Protocol). In this embodiment, for example, the output signal from the VoIP adapter 124 is sent onto an IP network of an optical line network 127 via a broadband router 125 and line terminating device 126. The VoIP adapter 124 converts a signal received from the optical line network 127 into a FAX or telephone signal having a voice-band frequency ranging from 300 to 3400 Hz. The VoIP adapter 124 sends the converted signal to the FAX apparatus 100 via the communication line 130. Also, the VoIP adapter 124 has a function of recognizing dial pulses from an input signal, or recognizing hooking in the telephone 128 externally attached to the FAX apparatus 100.

The FAX apparatus 100 with the aforementioned arrangement has various operation modes. This embodiment will explain a no-ringing FAX mode and F/T mode (FAX/TEL switching mode). In either operation mode, as will be described later, the telephone 128 is set in a disconnection state disconnected in advance from the line by the H-relay 110. The no-ringing FAX mode is an operation mode which allows FAX reception without causing the telephone 128 to ring in response to a CI signal when the CI detection circuit 108 detects reception of the CI signal. The F/T mode is an operation mode in which the SOC 101 determines whether a source is a telephone or FAX apparatus when the CI detection circuit 108 detects reception of a CI signal. In this mode, when the source is a telephone, the SOC 101 controls the telephone 128 to ring. When the source is a FAX apparatus, the SOC 101 controls to execute FAX reception.

The FAX apparatus 100 has a function of connecting the telephone 128 to the communication line 130 upon detection of an off-hook state of the telephone 128 in the no-ringing FAX mode. Thus, the FAX apparatus 100 provides a voice communication function using the telephone 128 to the user. However, upon disconnecting the line feeding circuit 112 from the communication line 130 and upon switching the H-relay 110, an impedance viewed from the communication line 130 becomes unstable. In this case, when the impedance changes to a low impedance and then quickly changes to a high impedance, the VoIP adapter 124 connected to the communication line 130 might erroneously recognize changes of a current and voltage generated in the communication line 130 due to the impedance changes as a dial pulse. For example, when the impedance changes to a low impedance to capture a line, then changes to a high impedance, and then returns to a low impedance, the VoIP adapter 124 erroneously recognizes such changes as a dial pulse "1". In this case, when the user inputs a dial pulse signal from the telephone 128 after the line is captured by the SDAA 104, the VoIP adapter 124 recognizes that dial pulse signal as that with a prefix "1", and the line is connected to a destination having a wrong telephone number.

Hence, in order to cope with this problem, the FAX apparatus 100 according to this embodiment executes an operation for suppressing abrupt changes of a current and voltage generated in the communication line upon connecting the external telephone to the communication line. More specifically, when the line feeding circuit 112 is disconnected from the communication line 130, and when the H-relay 110 is switched, the SDAA 104 captures a line using the line capture unit 1 having the DC characteristics of an impedance lower than the telephone 128 side when viewed from the communication line 130. This prevents the impedance viewed from the communication line 130 from becoming a high impedance (which could be mistaken for a dial pulse) because the communication line 130 has been able to follow the lower impedance route of the SDAA 104 rather than the higher impedance route of the external telephone. After that, the H-relay 110 connects the telephone 128 to the communication line 130, and the line capture state by the SDAA 104 is released in order that a line current is supplied to the telephone 128 side, thereby connecting the telephone 128 to the line 130.

Depending on the telephone 128 externally connected to the FAX apparatus 100, an impedance may become unstable when the telephone 128 is connected to the communication line 130, and a line current flows into the telephone 128. In this case, when the impedance temporarily changes in the external telephone, as described above, the VoIP adapter 124 may erroneously recognize changes of a current and voltage caused by those impedance changes as a dial pulse.

Hence, in the FAX apparatus 100 according to this embodiment, starting with the SDAA 104 in a line capture state by using the line capture unit 1 105, the SDAA 104 temporarily switches the line capture state to the line capture unit 2 106 without immediately releasing the line. The line capture unit 2 has a higher impedance than the line capture unit 1. The FAX apparatus 100 releases the line after then, thus gradually increasing a current amount flowing into the telephone 128. As a result, the impedance on the telephone 128 side can be prevented from becoming unstable, and the VoIP adapter 124 connected to the FAX apparatus 100 can be prevented from erroneously recognizing a dial pulse.

Operation in No-Ringing FAX Mode

Figure 3A:
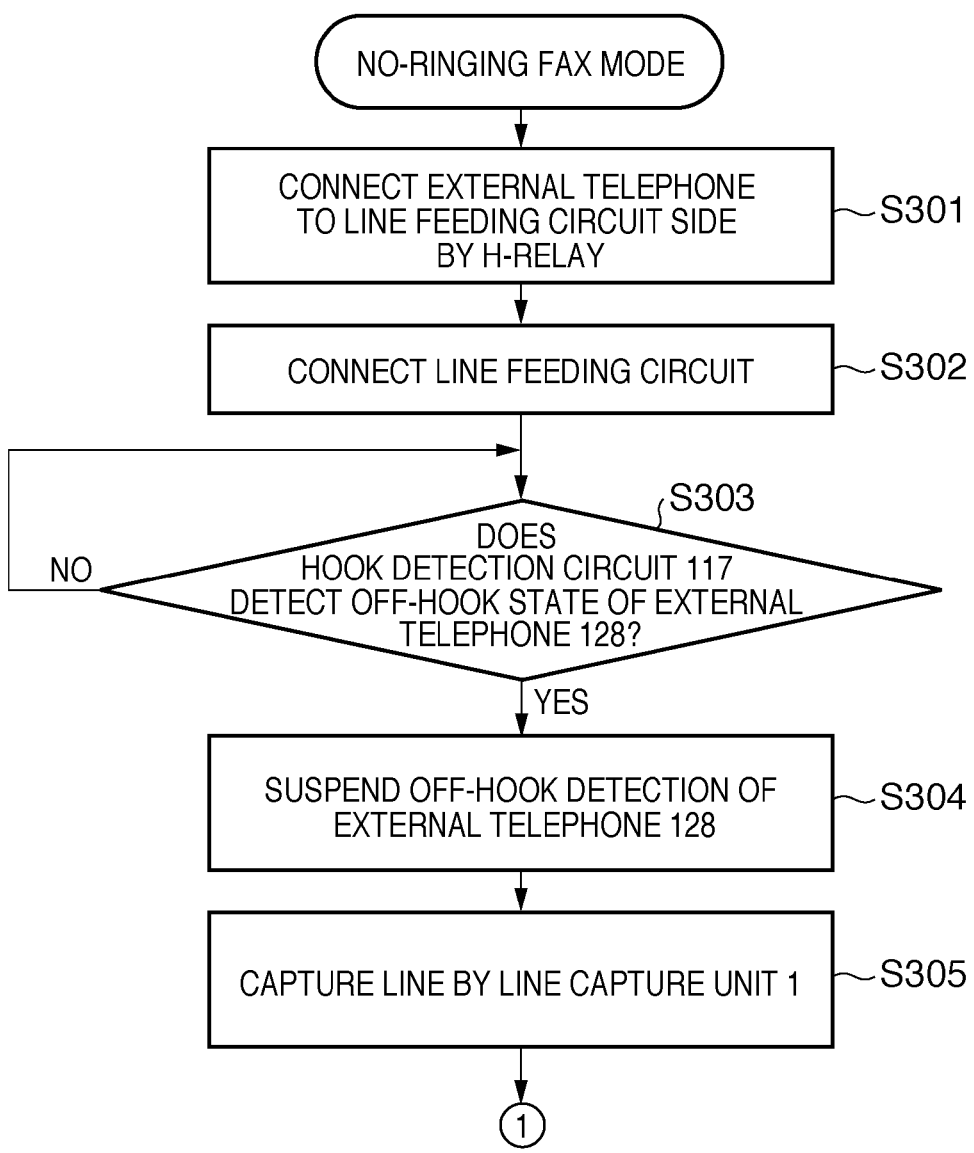
FIGS. 3A and 3B are flowcharts showing the operation sequence based on a no-ringing FAX mode of the FAX apparatus 100 according to the embodiment of the present invention.
Figure 3B:
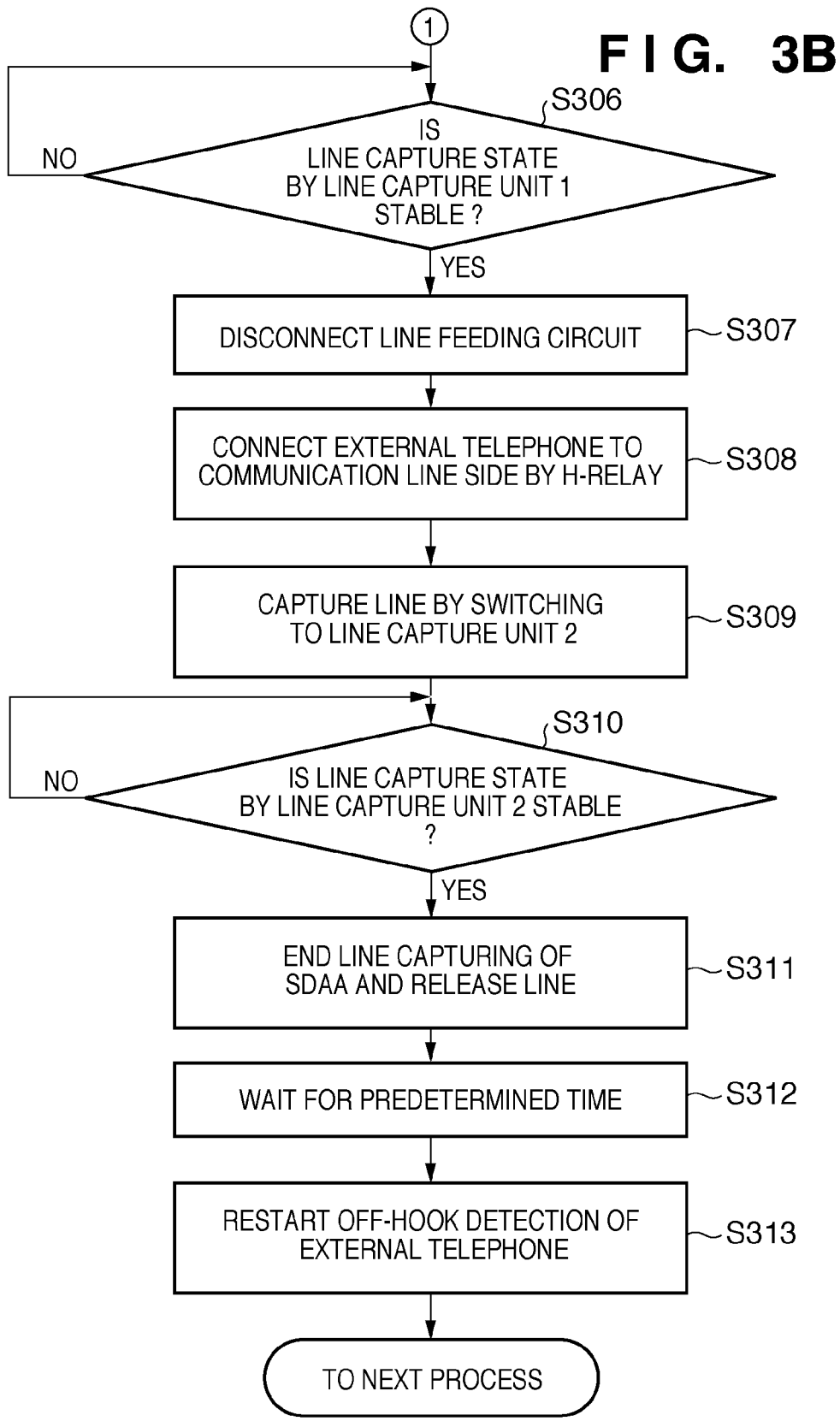
Figure 5:
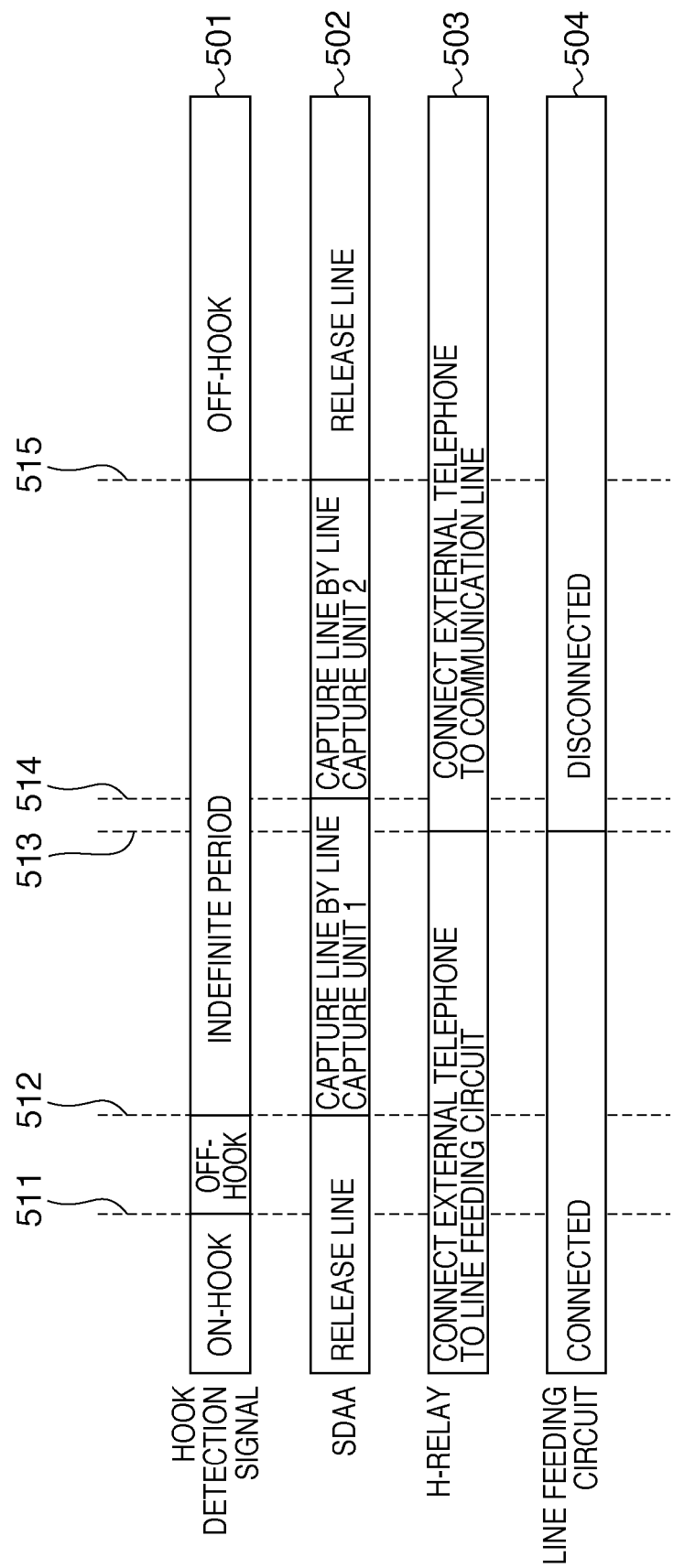
FIG. 5 is a timing chart showing the operation timings based on the no-ringing FAX mode of the FAX apparatus 100 according to the embodiment of the present invention.

The operation sequence executed when the external telephone 128 is set in an off-hook state in the FAX apparatus 100 during an operation in the no-ringing FAX mode will be described below with reference to FIGS. 3A and 3B. The flowcharts shown in FIGS. 3A and 3B are implemented when the CPU of the SOC 101 executes a program in the memory 140. Together with the operation sequence, operation timings will also be described with reference to FIG. 5. FIG. 5 shows a state 501 of the hook detection signal 114, a state 502 of the SDAA 104, a state 503 of the H-relay 110, and a state 504 of the line feeding circuit 112.

When the FAX apparatus 100 shifts to the no-ringing FAX mode, the SOC 101 connects the H-relay 110 to the line feeding circuit 112 side using the H-relay driving signal 111 in step S301. In step S302, the SOC 101 connects the line feeding circuit 112 to the communication line 130 using a line feeding circuit connection signal 113. Thus, a line current from the communication line 130 is supplied to the hook detection circuit 117.

In the FAX apparatus 100 in the no-ringing FAX mode, the SOC 101 determines in step S303 whether or not the hook detection circuit 117 detects an off-hook state of the telephone 128. When the hook detection circuit 117 detects an off-hook state of the telephone 128 (511 in FIG. 5), it sends the hook detection signal 114 to the SOC 101 to inform it of detection of the off-hook state. If the SOC 101 determines, based on the hook detection signal 114, that no off-hook state of the telephone 128 is detected (no in step S303), it repeats the determination process in step S303. On the other hand, if the SOC 101 determines that the off-hook state of the telephone 128 is detected (yes in step S303), the process advances to step S304. In step S304, the SOC 101 suspends or suppresses the output (i.e. the hook detection signal 114) of the off-hook detection of the telephone 128 by the hook detection circuit 117. After that, the process advances to step S305. The suspension or suppression the off-hook detection output 114 by the hook detection circuit 117 continues until a line capture state by the SDAA 104 (line capture unit 2 106) is released in step S311 to be described later. This suspension is executed to prevent the hook detection circuit 117 from erroneously detecting a hook state due to a change in current because a current to the hook detection circuit 117 changes depending on the line capture state of the SDAA 104.

In step S305, the SOC 101 (first capture control unit) controls the SDAA 104 to capture a line using the line capture unit 1 that has DC characteristics with an impedance (viewed from the communication line 130) sufficiently lower than the telephone 128 (512). After line capturing starts, the SOC 101 determines in step S306 in FIG. 3B whether or not a line capture state by the line capture unit 1 becomes stable. In this case, the SOC 101 executes this determination process using information which is associated with the DC characteristics of the line capture unit 1, and is provided from the SDAA 104. Alternatively, the SOC 101 may execute this determination process by interpreting that the line capture state has become stable when a predetermined period of time elapses based on a time measured by a timer. If the SOC 101 determines in step S306 that the line capture state by the line capture unit 1 is not stable, it repeats the determination process. On the other hand, if the SOC 101 determines that the line capture state becomes stable, the process advances to step S307.

After the line capture state by the line capture unit 1 becomes stable, the SOC 101 disconnects the line feeding unit 112 from the communication line 130 using the line feeding circuit connection signal 113 (513) in step S307. The SOC 101 (acting as a connection control unit) connects the H-relay 110 to the line side using the H-relay driving signal 111 (513) in step S308 such that the external telephone is directly connected to the line 130, rather than being connected via the line feeding circuit 112. As a result, a line current from the communication line 130 begins to flow toward the telephone 128. However, as described above, since the impedance of the line capture unit 1 is set to be lower than the telephone 128, most of the line current flows to the line capture unit 1 side rather than the H-relay 110 side (i.e. the telephone 128 side). For this reason, since a current amount flowing toward the H-relay 110 side is very small, an abrupt change in current that flows to the telephone 128 side upon switching of the H-relay 110 can be suppressed.

In step S309, the SOC 101 (acting as a second capture control unit) controls the SDAA 104 to switch the line capture unit to the line capture unit 2 106 having DC characteristics with an impedance higher than the line capture unit 1 105 (out of the plurality of line capture units 1 to 3 labelled 105, 106 and 107 respectively), thus starting line capturing (514). With this process, because the impedance of the SDAA 104 viewed from the communication line 130 becomes higher, a current amount which flows to the telephone 128 via the H-relay 110 increases compared to the case using the line capture unit 1. The impedance of the second line capture unit 2 may be slightly less, the same, or more than the impedance of the external telephone, as long as a larger portion of the current is being transmitted to the external telephone than there was when the first line capturing unit was connected to the communication line 130. Furthermore, the SOC 101 determines in step S310 whether or not a line capture state by the line capture unit 2 becomes stable. This process can be implemented by the same process as in step S306. If the SOC 101 determines that the line capture state is not stable (no in step S310), it repeats the determination process in step S310. On the other hand, if the SOC 101 determines that the line capture state does become stable (yes in step S310), the process advances to step S311.

After the line capture state by the line capture unit 2 becomes stable, the SOC 101 (acting as a line release unit) controls the SDAA 104 to end line capturing by the SDAA 104 so as to release the line capture state (515) in step S311. As a result, since a line current from the communication line 130 fully flows to the telephone 128, a current amount flowing to the telephone 128 further increases. With the above process, a current amount to the telephone 128 can be prevented from abruptly increasing upon releasing the line capture state by the SDAA 104. After that, the SOC 101 restarts the suspended off-hook detection of the telephone 128.

Operation in F/T Mode

Figure 4:
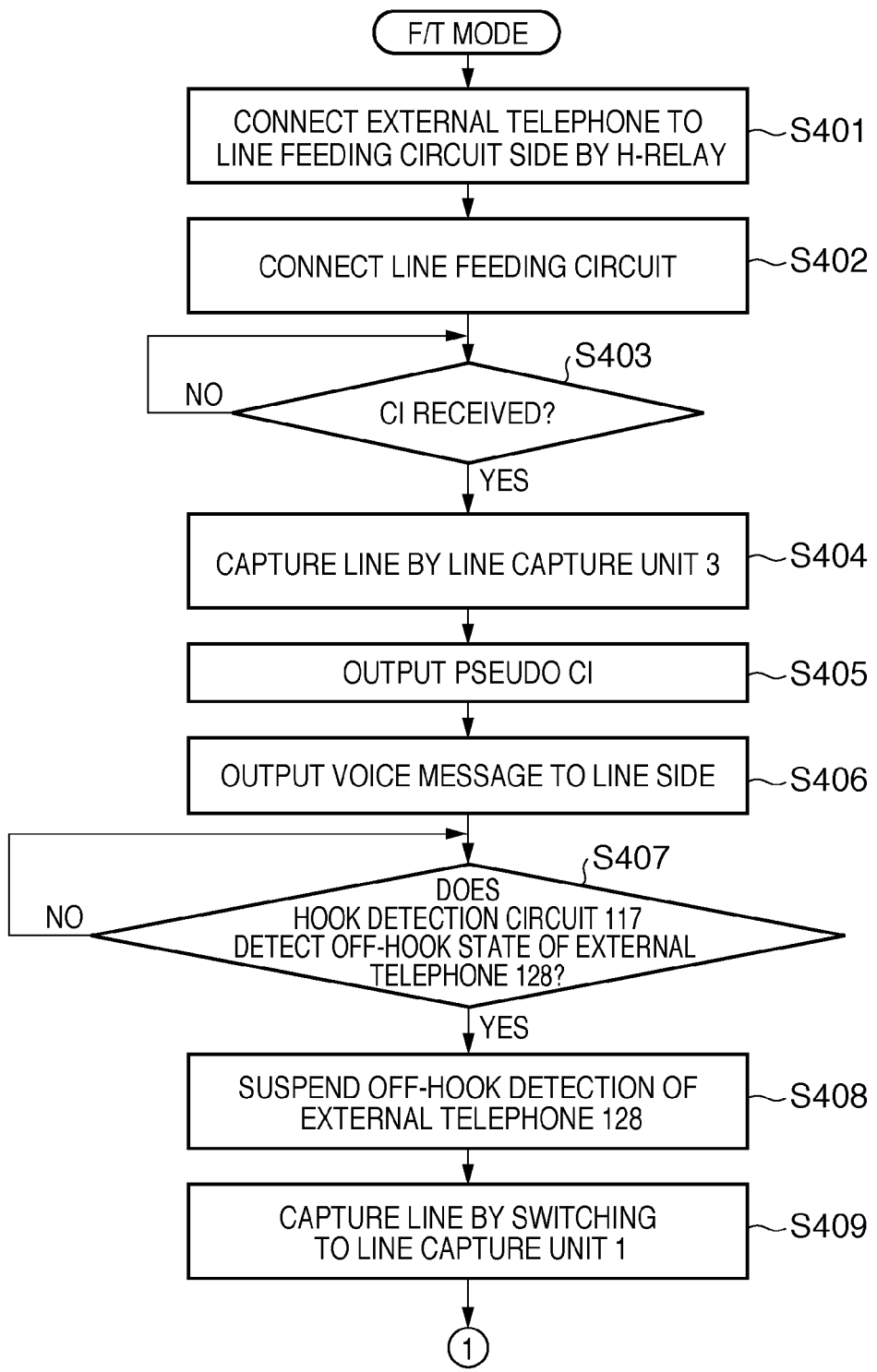
FIG. 4 is a flowchart that, together with FIG. 3B shows the operation sequence based on an F/T mode (FAX/TELEPHONE) of the FAX apparatus 100 according to the embodiment of the present invention.
Figure 6:
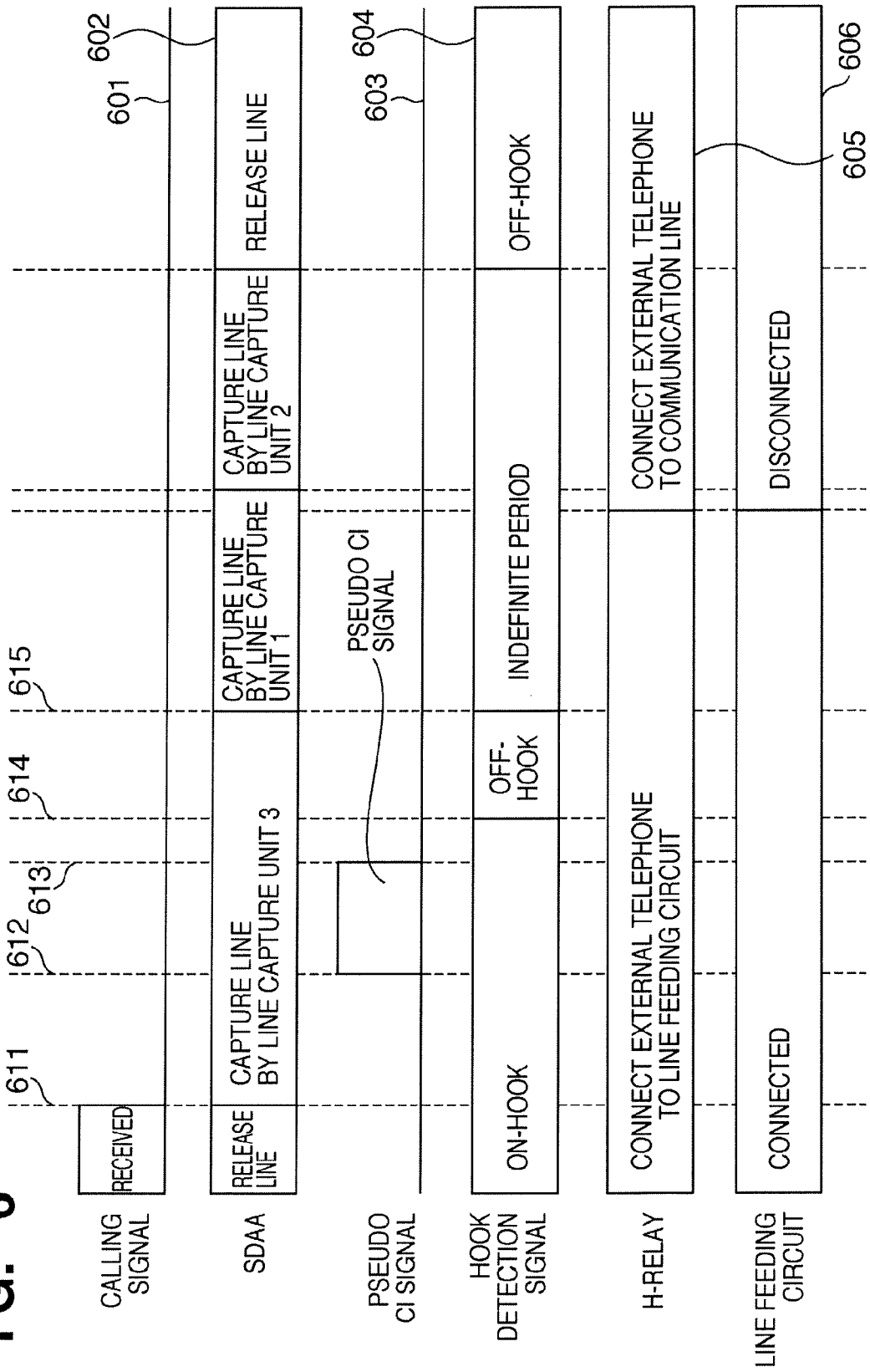
FIG. 6 is a timing chart showing the operation timings based on the F/T mode of the FAX apparatus 100 according to the embodiment of the present invention.

The operation sequence executed when a calling signal (CI signal) from the communication line 130 is received in the FAX apparatus 100 during the operation in the F/T mode will be described below with reference to FIGS. 4 and 3B. The flowcharts shown in FIGS. 4 and 3B are implemented when the CPU of the SOC 101 executes a program in the memory 140. Together with this operation sequence, operation timings will also be described with reference to FIG. 6. FIG. 6 shows a state 601 of the calling (CI) signal, a state 602 of the SDAA 104, a state 603 of a pseudo CI signal, a state 604 of the hook detection signal 114, a state 605 of the H-relay 110, and a state 606 of the line feeding circuit 112. A difference with this mode from the no-ringing FAX mode in FIGS. 3A and 3B is that a further line-capturing step is incorporated using the line capture unit 3, so as to communicate with a partner apparatus before an off-hook state of the telephone 128 is detected after the CI signal is received.

When the FAX apparatus 100 shifts to the F/T mode, the SOC 101 connects the H-relay 110 to the line feeding circuit 112 side and the line feeding circuit 112 to the communication line 130 in steps S401 and S402 as in steps S301 and S302 in FIG. 3A.

In the FAX apparatus 100 in the F/T mode, the SOC 101 determines in step S403 whether or not a CI signal is received from the communication line 130. If the SOC 101 determines that no CI signal is received, it repeats the determination process. On the other hand, if the SOC 101 determines that the CI signal is received, the process advances to step S404. In step S404, the SOC 101 (acting as a third capture control unit) controls the SDAA 104 to capture a line using the line capture unit 3 of the plurality of line capture units 1 to 3 labelled 105, 106 and 107 respectively (611). After the line is captured, the SOC 101 sends a pseudo CI signal from the pseudo CI output circuit 116 to the telephone 128 using the pseudo CI driving signal 115 (612, 613) in step S405. With this signal, the SOC 101 controls the telephone 128 to ring, thereby informing the user of call reception. Furthermore, in step S406 the SOC 101 outputs a voice message onto the communication line 130. With this process, a voice message indicating that calling the user is in progress can be transmitted to a partner apparatus which output the CI signal. After that, the process advances to step S407.

The SOC 101 determines in step S407 whether or not the hook detection circuit 117 detects an off-hook state of the telephone 128. This determination process can be implemented by the same process as in step S303. If the SOC 101 determines that an off-hook state of the telephone 128 is not detected, it repeats the determination process in step S407. On the other hand, if the SOC 101 determines that an off-hook state of the telephone 128 is detected (614), the process advances to step S408. In step S408, the SOC 101 suspends the output of the off-hook detection of the telephone 128 by the hook detection circuit 117 (615) as in step S304. After that, the process advances to step S409.

In order to prevent the VoIP adapter 124 from erroneously recognizing a dial pulse or DTMF (dual tone multifrequency) signal input after hooking, a line is connected to the telephone 128 based on line capturing operations by the line capture units 1 and 2 as in the processes in FIGS. 3A and 3B. In step S409, the SOC 101 controls the SDAA 104 to switch the line capture unit to the line capture unit 1 105 having DC characteristics with an impedance lower than the line capture unit 3 107, thereby capturing a line. Since the processes in subsequent steps S306 to S313 in the F/T mode are the same as those in steps S306 to S313 in the no-ringing FAX mode described above, a description thereof will not be repeated.

As described above, when the communication apparatus according to this embodiment connects the external telephone, which is disconnected from the communication line by the H-relay, to the communication line, it captures a line using the SDAA 104, which is connected to the communication line in parallel to the telephone. More specifically, the SDAA 104 includes the plurality of line capture units having different impedances, and captures a line using one of these units. Upon detection of an off-hook state of the telephone, the SOC captures a line using the line capture unit 1 having an impedance lower than the telephone side, and then switches the H-relay to connect the telephone to the communication line. When the FAX apparatus includes the line feeding circuit connected to the line, the SOC also disconnects that circuit from the communication line. With this process, upon disconnecting the line feeding circuit from the communication line, and upon switching the H-relay, the impedance viewed from the communication line can be prevented from becoming a high impedance, thereby suppressing changes of a current and voltage in the communication line.

Furthermore, the communication apparatus according to this embodiment temporarily switches a line capture state to the line capture unit 2 having a higher impedance than the line capture unit 1 before it releases the line after the H-relay is switched. With this process, since a current amount flowing to the telephone can be gradually increased compared to a case in which the line is immediately released, an unstable change in impedance viewed from the communication line can be suppressed, thereby suppressing changes of a current and voltage in the communication line. With the aforementioned processes, the communication apparatus according to this embodiment can prevent the adapter that is connected to it from erroneously recognizing a dial pulse.

Upon reception of a call from a partner apparatus 124 via the communication line 130, the communication apparatus 100 according to this embodiment captures a line using the line capture unit 3 107, which has an impedance higher than the line capture unit 1 105 and lower than the line capture unit 2 106, so as to communicate with the partner apparatus. After that, upon detection of an off-hook state of the telephone, the communication apparatus executes the processes using the line capture units 1 and 2, as described above. In this way, the adapter connected to the communication apparatus can be prevented from erroneously recognizing a dial pulse or DTMF signal input after hooking (i.e. hanging up) of the telephone.

First Modification

The present invention is not limited to the aforementioned embodiment, and allows various modifications. Modifications to be exemplified below can obtain the same effects as in the aforementioned embodiment. FIG. 2 shows a first modification associated with the FAX apparatus 100 according to the aforementioned embodiment. A difference between the FAX apparatuses 100 shown in FIGS. 1 and 2 is the respective presence/absence of the line feeding circuit 112. In this way, when the FAX apparatus 100 does not include any line feeding circuit 112, hook detection of the telephone 128 can be attained using a DC power supply 131. Note that the pseudo CI output circuit 116 may include a DC output function, and may supply a current to the hook detection circuit 117.

When the FAX apparatus 100 has the arrangement shown in FIG. 2, the operation sequence shown in FIGS. 3A and 3B are implemented by excluding steps S302 and S307, and that shown in FIG. 4 is implemented by excluding step S402 (and S307). Furthermore, in this case, the timing charts shown in FIGS. 5 and 6 corresponding to FIGS. 3A, 3B and 4 correspond to those except for the states 504 and 606 of the line feeding circuit 112.

Second Modification

Figure 2:
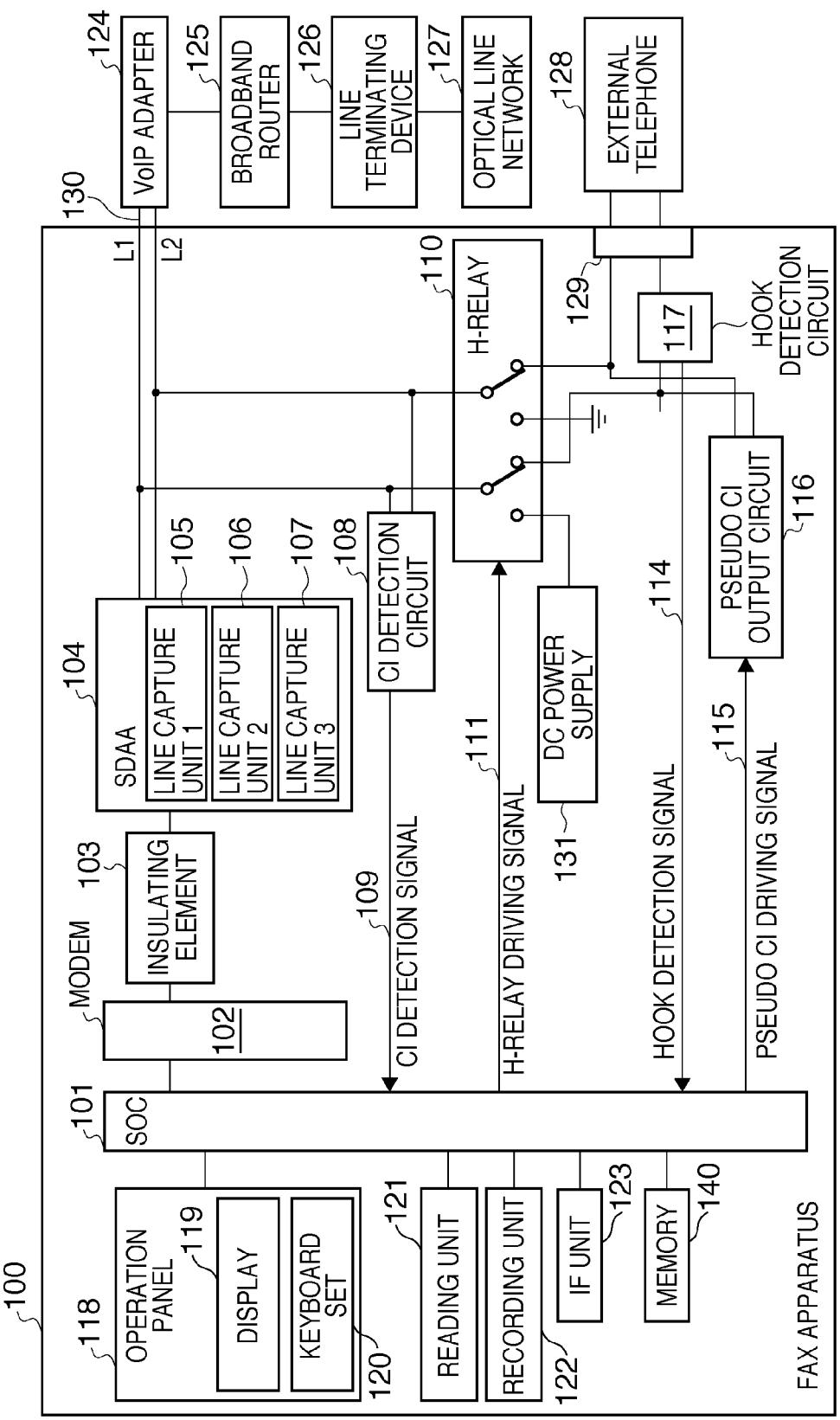
FIG. 2 is a block diagram showing an example of the block arrangement associated with a modification of the FAX apparatus 100 according to the embodiment of the present invention.

The embodiment associated with the FAX apparatus 100 shown in FIGS. 1 and 2 has explained the case in which the SDAA 104 includes the plurality of line capture units 105 to 107 (line capture units 1 to 3) having different impedances. In that embodiment, in a process of connecting the telephone 128, which is externally connected to the FAX apparatus 100, to the communication line 130, the SDAA 104 selectively uses one of these line capture units at a time to change a line capture state under the control of the SOC 101.

However, the present invention is not limited to the case in which the SDAA 104 includes the plurality of different line capture units. For example, the SDAA 104 may include an impedance-variable line capture unit. That is, the FAX apparatus 100 according to the second modification includes a single line capture unit which can attain DC characteristics of different impedances in place of the separate line capture units 1 to 3. In this case, the SDAA 104 controls a line capture state by temporally changing the impedance of the line capture unit in accordance with an impedance change instruction from the SOC 101.

In this modification, the line capture unit included in the SDAA 104 can be set at three different impedances corresponding to at least those of the line capture units 1 to 3 according to the aforementioned embodiment. The line capture unit of this modification can be set at first and second impedances as those corresponding to the line capture units 1 and 2. The line capture unit of this modification is set at the first and second impedances in a situation using the line capture units 1 and 2 in which a line is captured to connect the telephone 128 to the communication line 130. As in the above embodiment, the first impedance is lower than the telephone 128 side when viewed from the communication line 130, and is, for example, a low impedance of about 150Ω with respect to a current of 20 mA. The second impedance is higher than the first impedance, and is, for example, a high impedance of about 600Ω with respect to a current of 20 mA.

The line capture unit of this modification can be set at a third impedance as that corresponding to the line capture unit 3 of the aforementioned embodiment. The line capture unit of this modification is set at the third impedance in a situation using the line capture unit 3 in which the SDAA 104 communicates with a partner apparatus via the communication line 130. As in the above embodiment, the third impedance is higher than the first impedance and is lower than the second impedance. The third impedance is, for example, a middle impedance of about 300Ω with respect to a current of 20 mA, which is suited to communications.

The operation sequence executed when the external telephone 128 is set in an off-hook state during the operation of the FAX apparatus 100 according to this modification in the no-ringing FAX mode is basically the same as that shown in FIGS. 3A and 3B. The operation sequence executed when a CI signal is received from the communication line 130 during the operation in the F/T mode is basically the same as that shown in FIGS. 4 and 3B. In this modification, the line capture operations by the line capture units 1 to 3 shown in FIGS. 3A, 3B and 4 can be implemented by the single line capture unit included in the SDAA 104. In this case, the line capture operations respectively performed by the line capture units 1 to 3 may instead be executed when the SDAA 104 sets or changes the impedance of the single line capture unit to the first to third impedances according to an instruction from the SOC 101.

This modification has explained the case in which the impedance of the line capture unit included in the SDAA 104 is set or changed under the control of the SOC 101, as in the embodiment described using FIGS. 3A, 3B and 4. The present invention can be implemented when the SDAA 104 sets or changes the impedance of the line capture unit by itself independently of the control by the SOC 101, in addition to the case in which the SDAA 104 uses the line capture unit under the control of the SOC 101, as described above. In this case, the control by the SOC 101 can be simplified. This modification can be combined with the first modification described above.

Third Modification

As shown in FIGS. 1 and 2, the embodiment and modifications described so far have explained the case in which the FAX apparatus 100 includes the silicon DAA (SDAA 104) as a network control unit (NCU) which controls the line connection state with respect to the communication line 130. However, the present invention is not limited to the case in which the FAX apparatus 100 includes the SDAA 104 as a network control unit. As will be described below as a third modification, the FAX apparatus 100 can be implemented as that which includes an NCU which does not use any SDAA 104.

Figure 7:
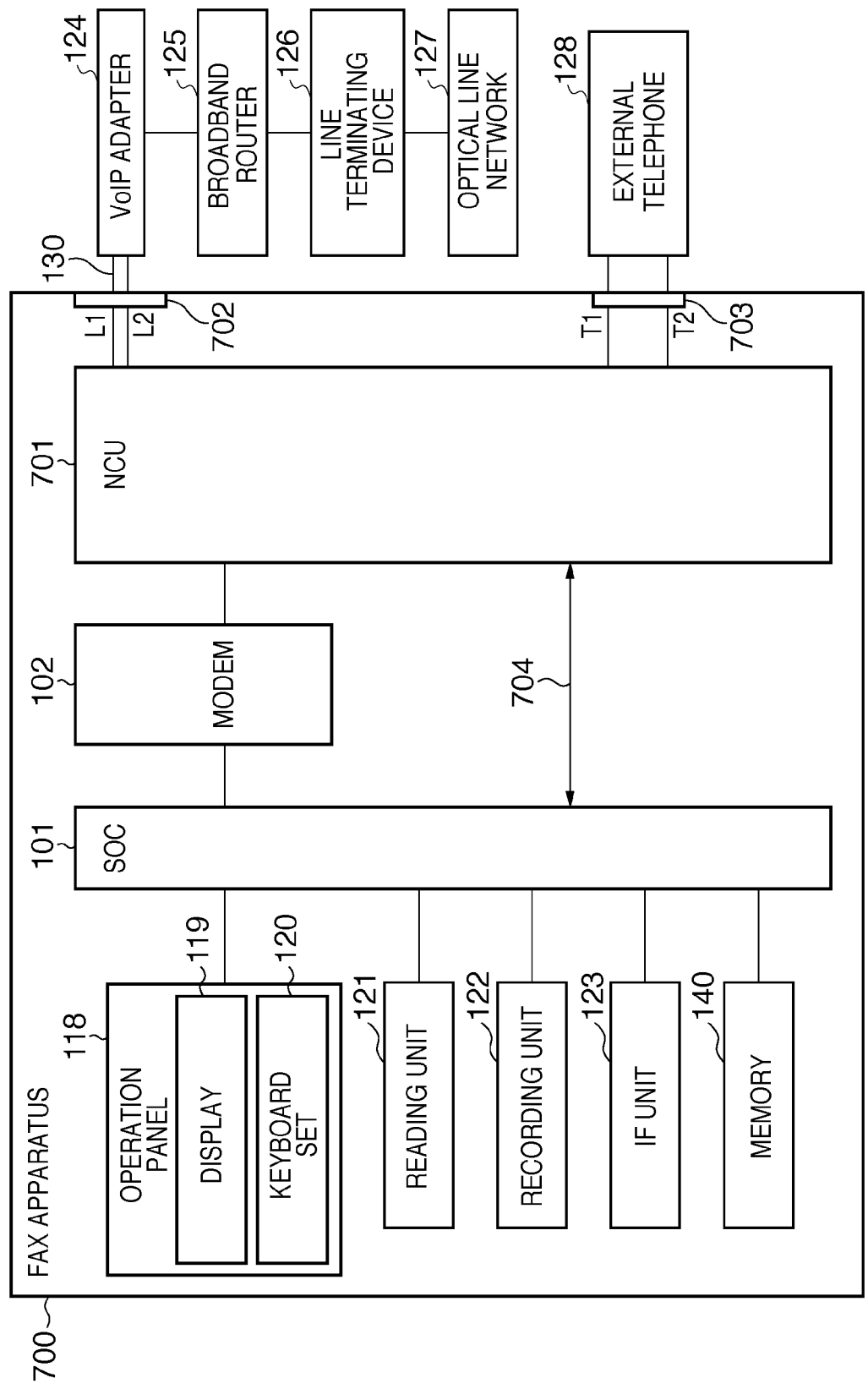
FIG. 7 is a block diagram showing an example of the block arrangement of a FAX apparatus 700 according to a third modification of the present invention.

FIG. 7 is a block diagram showing the arrangement of a FAX apparatus 700 according to the third modification of the present invention. Compared to the FAX apparatus 100 shown in FIGS. 1 and 2, the FAX apparatus 700 includes an NCU 701 in place of the SDAA 104. Also, a circuit which corresponds to the CI detection circuit 108, H-relay 110, hook detection circuit 117, and the like included in the FAX apparatus 100 is built in the NCU 701. The NCU 701 is connected to the modem 102, and also to a connection terminal 702 to which the communication line 130 is connected and a connection terminal 703 to which the external telephone 128 is connected. The connection terminals 702 and 703 respectively have L1 and L2 terminals and T1 and T2 terminals as modular connectors. The NCU 701 exchanges control signals, and various kinds of information and messages with the SOC 101 via a signal line 704 including one or more signal lines.

Figure 8:
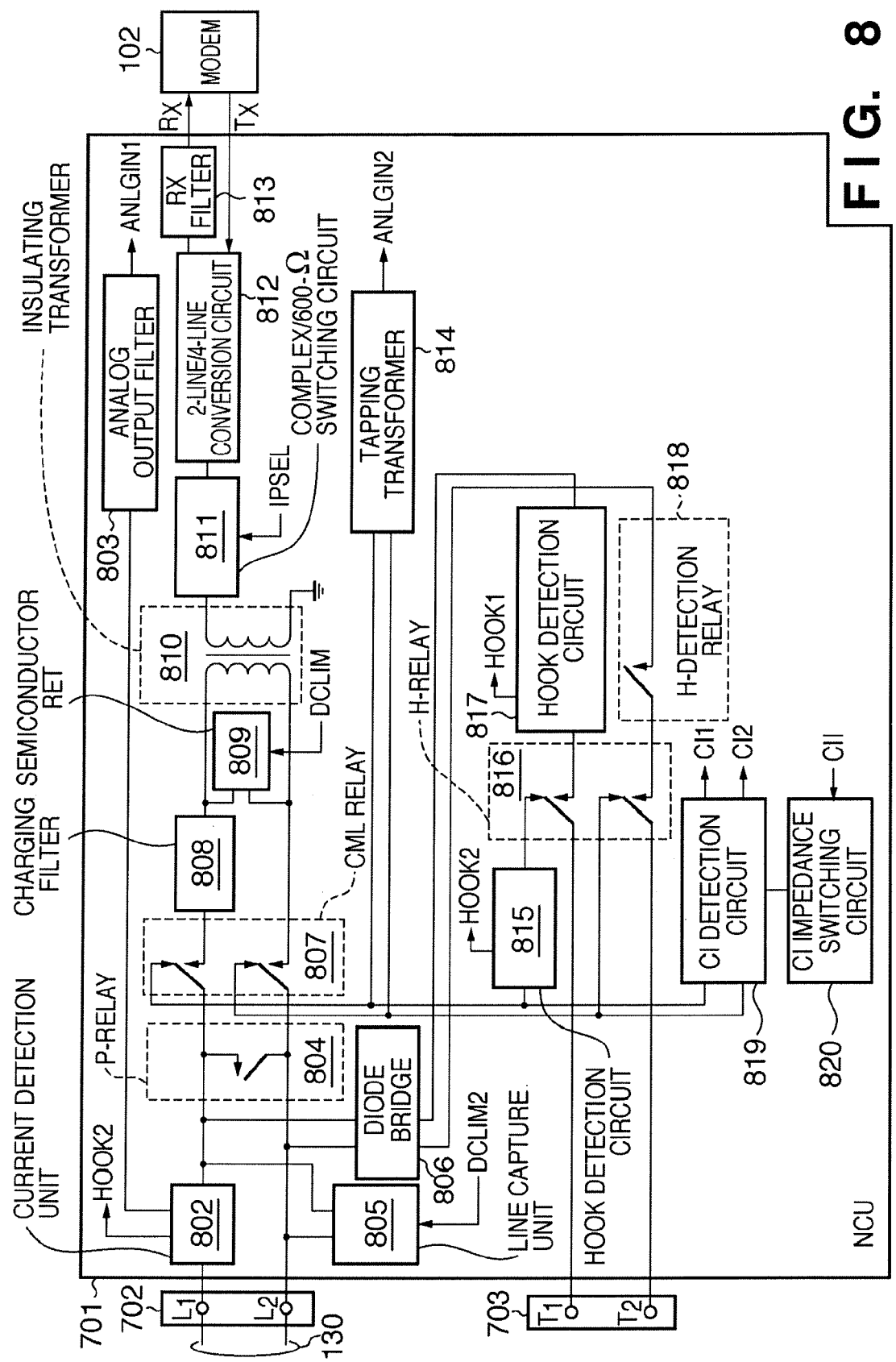
FIG. 8 is a block diagram showing an example of the block arrangement of an NCU (Network Control Unit) 701 in the FAX apparatus 700 according to the third modification of the present invention.

FIG. 8 is a block diagram showing an example of the internal arrangement of the NCU 701 shown in FIG. 7. In the NCU 701, a current detection unit 802 is connected to the communication line 130 via the connection terminal 702. The current detection unit 802 detects an off-hook state of the telephone 128 by detecting a current flowing from the communication line 130 side toward the telephone 128 side via the connection terminals 702 and 703. Upon detection of the off-hook state, the current detection unit 802 sends a HOOK2 signal indicating that detection to the SOC 101. The current detected by the current detection unit 802 is filtered by an analog output filter 803, and is sent as an ANLGIN1 signal to the SOC 101. To the current detection unit 802, a P-relay 804, a line capture unit 805 and a diode bridge 806 are connected. The P-relay 804 is a circuit for generating dial pulses. The diode bridge 806 is a bridge circuit used to rectify a signal on the communication line 130.

A CML (Connect Modem to Line) relay 807 is a relay circuit required to connect one of the telephone 128 side and the modem 102 side to the communication line 130. When the modem 102 side is connected to the communication line 130 by the CML relay 807, a signal from the communication line 130 is sent from the CML relay 807 to a charging filter 808. The charging filter 808 is a filter used to filter charging pulses sent from the communication line 130. To the charging filter 808, a semiconductor RET (return) circuit 809 is connected. The semiconductor RET circuit 809 is a circuit required to perform a DC line capture operation, and operates under the control of the SOC 101 using a DCLIM signal. The charging filter 808 is also connected to an insulating transformer 810. The insulating transformer 810 isolates between the communication line side and the modem side. To the insulating transformer 810, a complex/600-Ω switching circuit 811 is connected. The complex/600-Ω switching circuit 811 is a circuit required to set an AC impedance at either a 600Ω terminal or complex terminal according to an IPSEL signal from the SOC 101, and is connected to a 2-line/4-line conversion circuit 812.

A FAX sending signal Tx sent from the modem 102 to the communication line 130 is input to the 2-line/4-line conversion circuit 812 which converts 2 lines on the communication line 130 side to 4 lines on the modem side. On the other hand, a FAX receiving signal Rx from the communication line 130 to the modem 102 is output from the 2-line/4-line conversion circuit 812 to the modem 102 via an RX filter 813. Note that the RX filter removes, from the received FAX signal, frequencies other than voice-band frequencies of a voice band ranging from 300 to 3400 Hz.

When the communication line 130 is connected to the telephone side by the CML relay 807, a tapping transformer 814 detects a FAX signal sent from a partner apparatus connected via the communication line 130. Upon detection of the FAX signal, the tapping transformer 814 sends an ANLGIN2 signal indicating that detection to the SOC 101.

The line capture unit 805 corresponds to those included in the SDAA 104 shown in FIGS. 1 and 2. Note that the line capture unit may include a plurality of line capture units 1 to 3 having different impedances, as shown in FIGS. 1 and 2, or may include a single line capture unit which can change an impedance between first to third impedances as in the second modification. The line capture unit 805 controls a line capture state based on a DCLIM2 signal as a control signal sent from the SOC 101.

A CI detection circuit 819 corresponds to the CI detection circuit 108 shown in FIGS. 1 and 2, and detects a CI signal received from the communication line. The CI detection circuit 819 transmits the presence/absence of detection to the SOC 101 using CI detection signals CI1 and CI2. Note that a CI impedance switching circuit 820 is a switching circuit which switches an impedance during CI reception in accordance with a control signal CII received from the SOC 101.

Hook detection circuits 815 and 817 correspond to the hook detection circuit 117 shown in FIGS. 1 and 2, and are detection circuits which detect an off-hook state of the telephone 128 when the telephone 128 is connected to the communication line 130. The hook detection circuits 815 and 817 transmit the presence/absence of the off-hook state to the SOC 101 respectively using a HOOK2 signal and HOOK1 signal.

An H-relay 816 corresponds to the H-relay 110 shown in FIGS. 1 and 2, and is a relay circuit which switches between a connection state and disconnection state of the telephone 128, externally connected to the FAX apparatus 700 via the connection terminal 703, with respect to the communication line 130. An H-detection relay 818 is a circuit which supplies a current from the diode bridge 806 to the hook detection circuit 817.

In addition, although not shown in FIG. 8, the FAX apparatus 700 may include a line feeding circuit for driving the hook detection circuits 815 and 817. Alternatively, the hook detection circuits 815 and 817 may be driven using a DC power supply. Although not shown in FIG. 8, the FAX apparatus 700 includes a pseudo CI output circuit as in the FAX apparatus 100.

The operation sequence executed when the external telephone 128 is set in an off-hook state during the operation of the FAX apparatus 700 in the no-ringing FAX mode, and that executed when a CI signal is received from the communication line 130 during the operation in the F/T mode are the same as those shown in FIGS. 3A, 3B and 4. When the line capture unit 805 of the FAX apparatus 700 includes a signal line capture unit in place of three line capture units 1 to 3, the same operation sequences as in those of the aforementioned second modification are used. As described above, the present invention can also be implemented as the FAX apparatus 700 including the NCU 701 that does not use any SDAA 104.

Other Embodiments

Aspects of the present invention can also be realized by a computer of a system or apparatus (or devices such as a CPU (central processing unit) or MPU (microprocessing unit) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-174744, filed Jul. 27, 2009, and No. 2010-122030, filed May 27, 2010, which are hereby incorporated by reference herein in their entirety.

What is claimed is:

1. A communication apparatus, which comprises a connection unit that an external telephone is connected to, a switching unit that switches between a connection state in which the external telephone is connected to a line and a disconnection state in which the external telephone is disconnected from the line, a detection unit that detects an off-hook state of the external telephone, and a network control unit that is connected to the line in parallel to the external telephone, and controls a capture state of the line, said apparatus comprising:
a first capture control unit that captures, when the detection unit detects the off-hook state of the external telephone in the disconnection state, the line using a first line capture unit, an impedance of which is lower than the external telephone side, and which is included in the network control unit;
a connection control unit that connects the external telephone to the line by switching the switching unit to the connection state after the first line capture unit captures the line;
a second capture control unit that captures the line by switching to a second line capture unit, an impedance of which is higher than the first line capture unit and which is included in the network control unit, after the external telephone is connected to the line; and
a line release unit that releases the capture state of the line by the second line capture unit after the second line capture unit captures the line.

2. The apparatus according to claim 1, further comprising:
a line feeding unit that is connected to the line, and supplies a line current of the line to the detection unit so as to drive the detection unit,
wherein said connection control unit further disconnects said line feeding unit from the line after the first line capture unit captures the line.

3. The apparatus according to claim 1, further comprising:
a third capture control unit that captures, when a call is received from a partner apparatus via the line before the detection unit detects the off-hook state of the external telephone in the disconnection state, the line using a third line capture unit, an impedance of which is higher than the first line capture unit and is lower than the second line capture unit, and which is included in the network control unit so as to make the network control unit communicate with the partner apparatus,
wherein said first capture control unit captures the line by switching the third line capture unit to the first line capture unit when the detection unit detects the off-hook state of the external telephone in the disconnection state.

4. The apparatus according to claim 1, wherein in the disconnection state, the detection unit suppresses detection of the off-hook state of the external telephone during a period after the off-hook state of the external telephone is detected until said line release unit releases the capture state of the line by the second line capture unit.

5. A communication apparatus, which comprises a connection unit that an external telephone is connected to, a switching unit that switches between a connection state in which the external telephone is connected to a line and a disconnection state in which the external telephone is disconnected from the line, a detection unit that detects an off-hook state of the external telephone, and a network control unit that is connected to the line in parallel to the external telephone, and controls a capture state of the line, said apparatus comprising:
a first capture control unit that sets, when the detection unit detects the off-hook state of the external telephone in the disconnection state, an impedance of a line capture unit included in the network control unit to be a first impedance lower than the external telephone side, and captures the line using the line capture unit;
a connection control unit that connects the external telephone to the line by switching the switching unit to the connection state after the line capture unit of the first impedance captures the line;
a second capture control unit that changes the impedance of the line capture unit to a second impedance higher than the first impedance, and captures the line using the line capture unit, after the external telephone is connected to the line; and
a line release unit that releases the capture state of the line by the line capture unit after the line capture unit of the second impedance captures the line.

6. The apparatus according to claim 5, further comprising:
a third capture control unit that sets, when a call is received from a partner apparatus via the line before the detection unit detects the off-hook state of the external telephone in the disconnection state, the impedance of the line capture unit to be a third impedance which is higher than the first impedance and is lower than the second impedance, and captures the line using the line capture unit,
wherein said first capture control unit changes the impedance of the line capture unit from the third impedance to the first impedance, and captures the line when the detection unit detects the off-hook state of the external telephone in the disconnection state.

7. A control method of a communication apparatus, which comprises a connection unit that an external telephone is connected to, a switching unit that switches between a connection state in which the external telephone is connected to a line and a disconnection state in which the external telephone is disconnected from the line, a detection unit that detects an off-hook state of the external telephone, and a network control unit that is connected to the line in parallel to the external telephone, and controls a capture state of the line, the method comprising:
controlling a first capture control unit to capture, when the detection unit detects the off-hook state of the external telephone in the disconnection state, the line using a first line capture unit, an impedance of which is lower than the external telephone side, and which is included in the network control unit;
controlling a connection control unit to connect the external telephone to the line by switching the switching unit to the connection state after the first line capture unit captures the line;

controlling a second capture control unit to capture the line by switching to a second line capture unit, an impedance of which is higher than the first line capture unit and which is included in the network control unit, after the external telephone is connected to the line; and controlling a line release unit to release the capture state of the line by the second line capture unit after the second line capture unit captures the line.

8. A control method of a communication apparatus, which comprises a connection unit that an external telephone is connected to, a switching unit that switches between a connection state in which the external telephone is connected to a line and a disconnection state in which the external telephone is disconnected from the line, a detection unit that detects an off-hook state of the external telephone, and a network control unit that is connected to the line in parallel to the external telephone, and controls a capture state of the line, the method comprising:

controlling a first capture control unit to set, when the detection unit detects the off-hook state of the external telephone in the disconnection state, an impedance of a line capture unit included in the network control unit to be a first impedance lower than the external telephone side, and to capture the line using the line capture unit;

controlling a connection control unit to connect the external telephone to the line by switching the switching unit to the connection state after the line capture unit of the first impedance captures the line;

controlling a second capture control unit to change the impedance of the line capture unit to a second impedance higher than the first impedance, and to capture the line using the line capture unit, after the external telephone is connected to the line; and controlling a line release unit to release the capture state of the line by the line capture unit after the line capture unit of the second impedance captures the line.

* * * * *